O. A. KREUTZBERG.
VOLUMETRIC AIR METER.
APPLICATION FILED JULY 21, 1913.
1,150,866.
Patented Aug. 24, 1915.
2 SHEETS—SHEET 1.
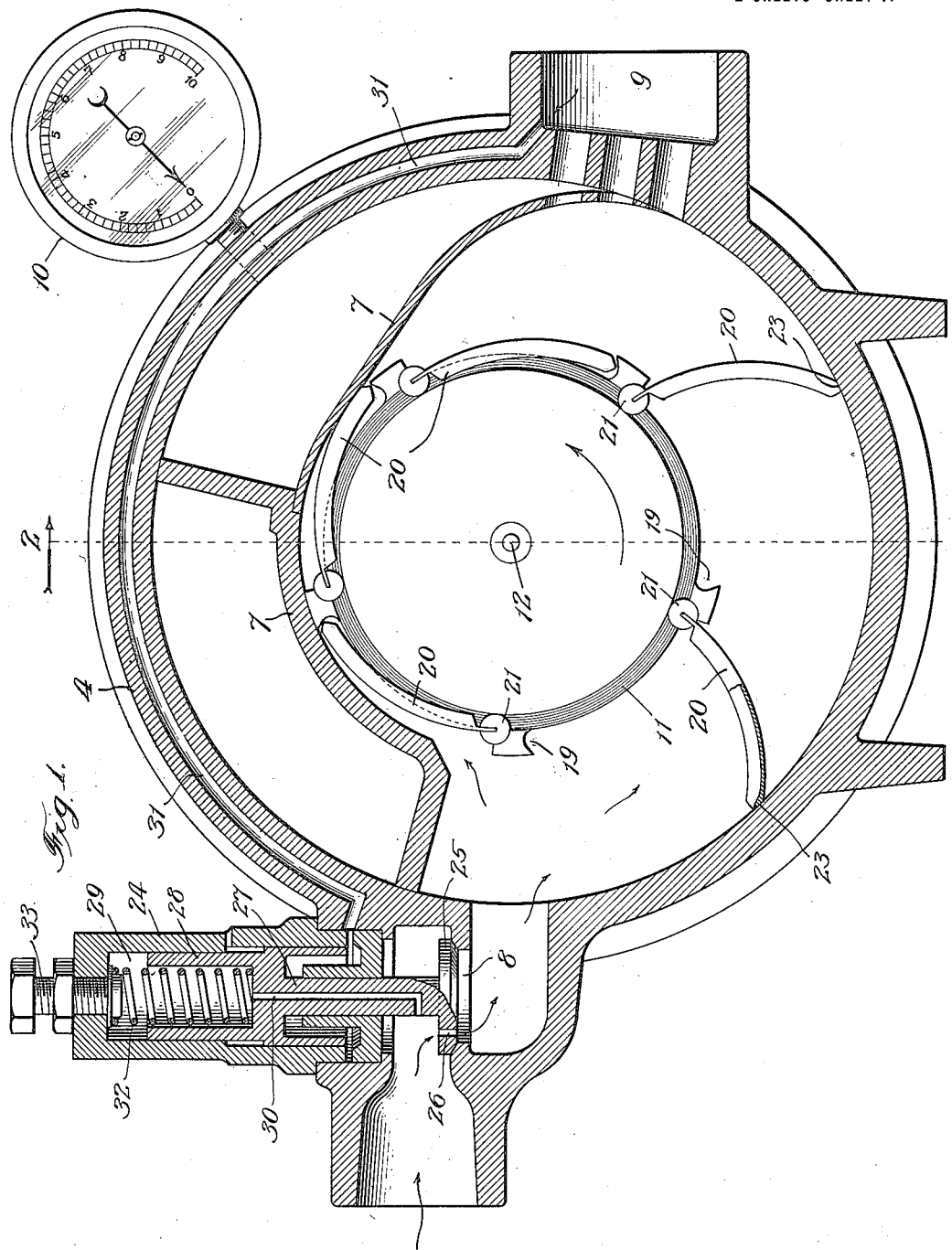

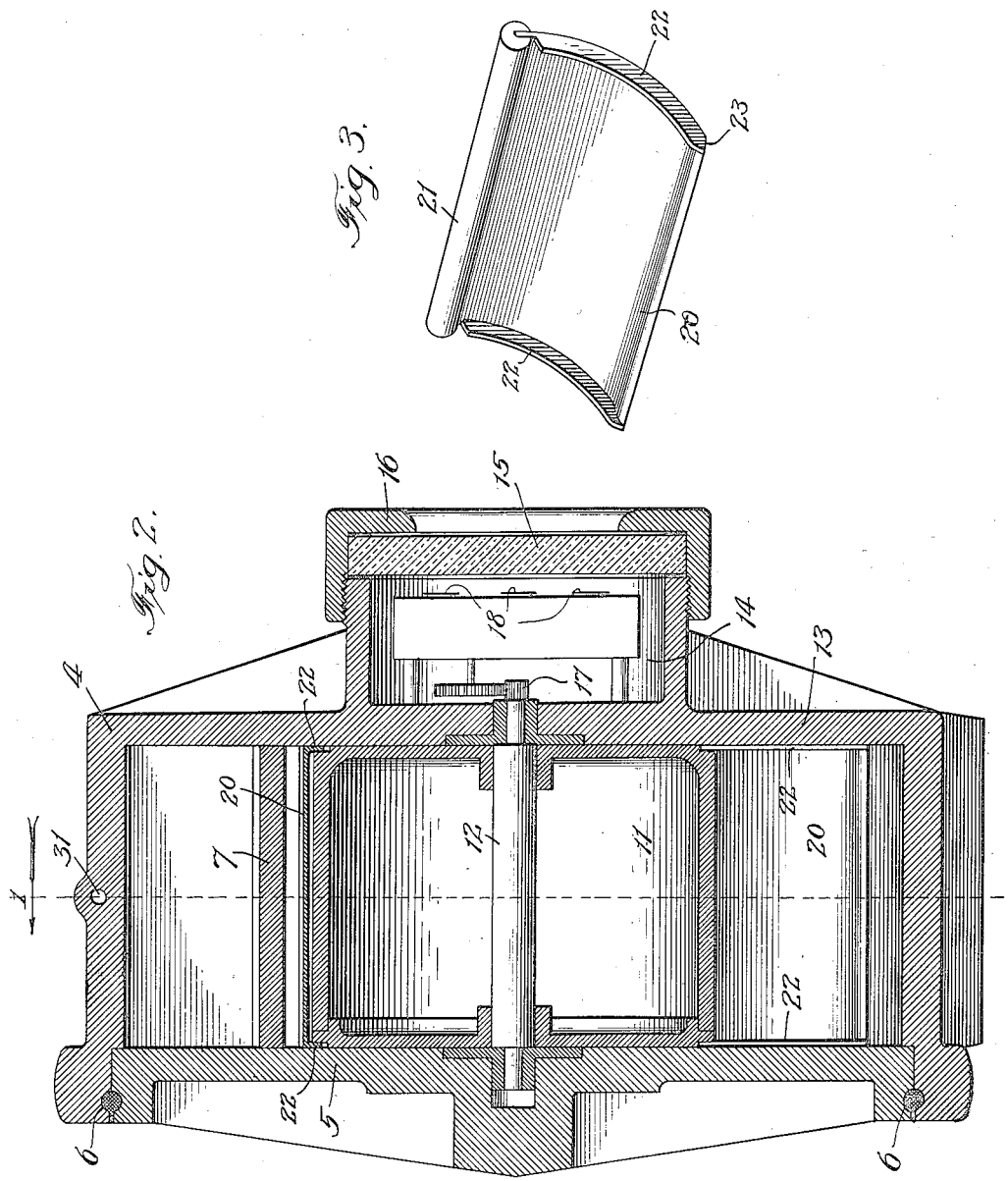

UNITED STATES PATENT OFFICE.

OTTO A. KREUTZBERG, OF LAKE BLUFF, ILLINOIS.

VOLUMETRIC AIR-METER.

1,150,866. Specification of Letters Patent. Patented Aug. 24, 1915.

Application filed July 21, 1913. Serial No. 780,169.

*To all whom it may concern:*

Be it known that I, OTTO A. KREUTZBERG, a citizen of the United States, residing at Lake Bluff, in the county of Lake and State of Illinois, have invented a new and useful Improvement in Volumetric Air-Meters, of which the following is a specification.

My invention relates to improvement in meters for measuring the volume of flow of air or gas under pressure, my object being more especially to provide a meter of simple and improved construction for use in measuring with great accuracy the volume of air under pressure passing to and operating pneumatic tools.

In the accompanying drawings Figure 1 is a view partly in section and partly in elevation of my improved meter, the section being taken on line 1 in Fig. 2; Fig. 2, a section taken on line 2 in Fig. 1; and Fig. 3, a perspective view of one of the vanes or blades of the meter.

The reference numeral 4 designates a shell or casing, closed at one side by a disk or cover 5 held in place by a calking ring 6. In the shell or casing 4 is a stationary wall or partition 7 of the shape shown in Fig. 1. In one side of the casing is an inlet port 8 adapted for connection with a compressed air-supply pipe, and in the opposite side of the casing is an outlet 9 adapted for connection with a line-pipe, not shown. Communicating with the interior of the casing adjacent to the outlet 9 is a pressure-gage 10 adapted to indicate in atmospheres the pressure in the meter and the pipe-line beyond the meter. In the shell or casing 4 is a drum 11 upon a central shaft 12 journaled in bearings in the walls 5 and 13 of the casing. On the outer side of the wall 13 is a chamber 14 closed by a glass disk 15 and screw-cap 16. On the shaft 12, where it projects into the chamber 14, is a pinion 17 meshing with a train of gears carrying pointers or indicators 18 which move over dials in a common manner to indicate in cubic feet the volume of air or gas passing through the casing and rotating the drum 11 and shaft 12. In the periphery of the drum 11 is a series of shallow cushioning pockets 19, and fitting each pocket is a blade or vane 20 of the segmental shape indicated and mounted at one edge upon a shaft 21 journaled in the drum at the ends of the pockets, as indicated in Fig. 1. The vanes 20 are provided at opposite ends with flanges 22 which ride against the inner surfaces of the walls 5 and 13, and on the ends of the vanes are flat surfaces 23 which ride against the inner peripheral surface of the casing and against the partition 7. Air or gas flowing through the casing from the inlet 8 to the outlet 9 opens the vanes or blades against the inner periphery of the casing and rotates the drum in the direction of the arrow in Fig. 1. When the vanes approach the cam-surface presented by the wall or partition 7, the air-cushion between the latter and said vanes prevents the vanes, in the preferred illustrated embodiment of my invention, from striking against the partition 7 in the rotation of the drum. As the vanes move toward the drum they close into the pockets 19 the air confined in the latter operating as a cushion to prevent the vanes from striking forcibly against the drum. Furthermore the air confined between the drum casing and the vanes during their movement, when driven by the fluid directly impinging against them, produces an air cushion for the vanes as they successively swing from folded to unfolded condition by the direct action of the fluid against them, and thus the vanes are prevented from striking against the inner periphery of the casing. Thus, even when rotating at a high speed, the device is practically noiseless and free from jar. On the shell 4 at the inlet port 8 is a valve-casing 24 containing a check-valve 25 seating against and closing the inlet-port 8. Extending through the valve 25 is a small feed-opening 26. The valve is upon a stem 27 carrying a piston 28 in the chamber 29 of the casing 24. The outer end-portion of the chamber 29 is of less diameter than the inner end-portion, and the piston 28 presents a materially greater area at its inner or lower end than at its outer or upper end. Extending through the valve-stem 27 to the upper side of the piston 28 is a port or passage 30. Cored or otherwise provided in the shell 4 is a passage 31 which opens at one end into the outlet port 9 and at its opposite end into the lower, enlarged, end of the chamber 29 below the piston 28 for subjecting the end of the piston of larger area to back-pressure from the outlet-port 9.

If the back-pressure in the pipe-line beyond the meter is very materially less than the pressure entering through the port 8, the air or gas entering the shell or casing will expand and increase in volume to such an extent as to interfere with the correct registering by the device, the purpose of which is to register with accuracy the volume of air at known pressure passing through the meter. In the operation of the device compressed air or gas flowing to the port 8 enters through the passage 30 and bears against the upper side of the piston 28 to maintain the valve 25 closed. The fluid under back pressure from the pipe-line at the outlet-port 9 flows through the passage 31 into the lower end of the chamber 29 of the valve-device and beneath the piston 28, and owing to the greater area of the under side of the piston, back pressure through the passage 31, even though materially less than the incoming pressure at the port 8, will lift the piston and open the valve 25 to permit full flow of fluid through the meter. While a great variation between the pressure entering at the port 8 and that escaping at the port 9 will cause such expansion of the fluid as to interfere with the volumetric measurement of the passing fluid, a very slight difference of pressure between the incoming and outgoing fluids will not produce such expansion as to materially interfere with the measurement of the flow. The difference in area between the upper and under sides of the piston 28 is such that when the pressure in the pipe-line beyond the meter is but a few ounces less than the pressure entering at the port 8 the valve 25 will be raised and opened. For the purpose of rendering the back pressure which will open the valve 25 more nearly equal to that entering the port 8, I provide in the chamber 29 a light spring 32 which supplements the pressure entering through the port 30 in seating the valve 25 against the resistance of the pressure entering through the passage 31. Thus, the incoming and outgoing pressures are maintained sufficiently close to avoid such expansion in the casing as would interfere with the proper measurement of the volume of flow. The resistance of the spring 32 is governed by a regulating-screw 33 on the casing.

The foregoing description is intended to convey a clear understanding of my improvements in what I now believe to be the best form of their embodiment, and no undue limitation should be understood therefrom. It is my intention to claim all that is novel in my invention and that the claims shall be construed as broadly as the prior state of the art may warrant.

What I regard as new and desire to secure by Letters Patent, is:

1. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, and valve mechanism controlling said inlet port and actuated by the back pressure of fluid at said outlet port, as and for the purpose set forth.

2. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, a valve controlling said inlet port, and differential piston mechanism operatively connected with said valve and subjected to the pressure at said inlet port and the back pressure at said outlet port, for the purpose set forth.

3. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, a valve controlling said inlet port, and differential piston mechanism presenting piston-surfaces of different effective area operatively connected with said valve, said meter containing passages for conducting fluid from said inlet and back-pressure at said outlet against the said piston-surfaces, for the purpose set forth.

4. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, a valve controlling said inlet port, a cylinder and a differential piston presenting piston-surfaces of different effective area operatively connected with said valve and operating in said cylinder, and means for conducting fluid from said inlet and back-pressure at said outlet against the said piston surfaces of different effective area, for the purpose set forth.

5. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, a valve controlling said inlet port, a cylinder, and a differential piston presenting piston surfaces of different effective area operatively connected with said valve and operating in said cylinder, said piston containing a passage communicating with said inlet and with the interior of said cylinder at the end of said piston presenting the less area, the casing containing a passage leading from said outlet to the end of said piston of larger area, for the purpose set forth.

6. In a volumetric air or gas meter, the combination of a shell or casing having an inlet port and an outlet port, a shaft journaled in the casing, hinged vanes carried by the shaft, a guide-wall in the casing regulating the opening and closing movements of the vanes, indicating mechanism operated by said shaft, a valve controlling said inlet port and containing a relatively small aperture, and differential piston mechanism presenting piston-surfaces of different effective area operatively connected with said valve and subjected at said surfaces to the pressure at said inlet port and the back pressure at said outlet port, for the purpose set forth.

7. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, and valve mechanism controlling said inlet port and actuated by the back pressure of fluid at said outlet port, as and for the purpose set forth.

8. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, a valve controlling said inlet port, and differential piston mechanism operatively connected with said valve and subjected to the pressure at said inlet port and the back pressure at said outlet port, for the purpose set forth.

9. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, a valve controlling said inlet port, and differential piston mechanism persenting piston-surfaces of different effective area operatively connected with said valve, said meter containing passages for conducting fluid from said inlet and back-pressure at said outlet against the piston-surfaces of varying area, for the purpose set forth.

10. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, a valve controlling said inlet port, a cylinder and a differential piston presenting piston-surfaces of different effective area operatively connected with said valve and operating in said cylinder, and means for conducting fluid from said inlet and back-pressure at said outlet against the piston surfaces of varying area, for the purpose set forth.

11. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, a valve controlling said inlet port, a cylinder, and a differential piston presenting piston-surfaces of different effective area operatively connected with said valve and operating in said cylinder, said piston containing a passage communicating with said inlet and with the interior of said cylinder at the end of said piston presenting the less area, and a passage leading from said outlet to the end of said piston of larger area, for the purpose set forth.

12. In a volumetric air or gas meter, the combination of a shell or casing having an inlet port and an outlet port, a rotatable device in said casing and including vanes against which the fluid impinges in passing through said casing, a wall in said casing adjacent to which said device moves during a part of its revolution, indicating mechanism operated by said rotatable device, a valve controlling said inlet port and containing a relatively small aperture, and differential piston mechanism operatively connected with said valve and subjected to the pressure at said inlet port and the back pressure at said outlet port, for the purpose set forth.

13. In a volumetric air or gas meter, the combination of a shell or casing having an inlet port and an outlet port, a rotatable device in said casing adapted to be driven by the fluid in passing through said casing, indicating mechanism operated by said rotatable device, and means operating automatically to close said inlet port when the pressure at said outlet port drops below a predetermined degree.

14. In a volumetric meter, the combination of a casing having an inlet port and an outlet port, indicating means, means in said casing operated by the fluid in passing through said casing for actuating said indicating means, and valve mechanism controlling said inlet port and controlled by the back pressure of fluid at said outlet port and operating automatically to open when said back pressure rises to a predetermined degree and to close when said back pressure drops below said predetermined degree.

15. In a volumetric meter, the combination of a casing having an inlet port and an outlet port, indicating means, means in said casing operated by the fluid in passing through said casing for actuating said indicating means, a valve controlling said inlet port, and differential piston mechanism presenting piston surfaces of different effective area, operatively connected with said valve, said meter containing passages for conducting fluid from said inlet and back pressure at said outlet against the said piston surfaces, for the purpose set forth.

16. In a volumetric meter, the combination of a casing having an inlet port and an outlet port, indicating means, means in said casing operated by the fluid in passing through said casing for actuating said indicating means, a valve controlling said inlet port, a cylinder and a differential piston presenting piston surfaces of different effective area, operatively connected with said valve and operating in said cylinder, and means for conducting fluid from said inlet and back pressure at said outlet against the said piston surfaces of different effective area, for the purpose set forth.

17. In a volumetric meter, the combination of a casing having an inlet port and an outlet port, indicating means, means in said casing operated by the fluid in passing through said casing for actuating said indicating means, a valve controlling said inlet port, a cylinder, and a differential piston presenting piston surfaces of different effective area, operatively connected with said valve and operating in said cylinder, said piston containing a passage communicating with said inlet and with the interior of said cylinder at the end of said piston presenting the less area, the casing containing a passage leading from said outlet to the end of said piston of larger area.

18. In a volumetric meter, the combination of a casing having an inlet port and an outlet port, indicating means, means in said casing operated by the fluid in passing through said casing for actuating said indicating means, a valve controlling said inlet port and containing a relatively small aperture, and differential piston mechanism presenting piston surfaces of different effective area, operatively connected with said valve and subjected at said surfaces to the pressure of said inlet port and the back pressure at said outlet port, for the purpose set forth.

19. In a volumetric meter, the combination of a casing having an inlet port and an outlet port, indicating means, means in said casing operated by the fluid in passing through said casing for actuating said indicating means, a valve controlling said inlet port, differential piston mechanism presenting piston surfaces of different effective area operatively connected with said valve, said meter containing passages for conducting fluid from said inlet and back pressure at said outlet against the said piston surfaces, and a spring coöperating with said piston mechanism and operating to yieldingly force it in one direction.

20. In a volumetric meter, the combination of a casing having an inlet port and an outlet port, indicating means, means in said casing operated by the fluid in passing through said casing for actuating said indicating means, and means operating automatically to close said inlet port when the pressure at said outlet port drops below a predetermined degree.

OTTO A. KREUTZBERG.

In presence of—
   A. C. FISCHER,
   O. C. AVISUS.